US008930356B2

(12) United States Patent
Kawale et al.

(10) Patent No.: US 8,930,356 B2
(45) Date of Patent: Jan. 6, 2015

(54) TECHNIQUES FOR MODIFYING A QUERY BASED ON QUERY ASSOCIATIONS

(75) Inventors: Jaya Kawale, Bangalore (IN); Aditya Pal, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 1284 days.

(21) Appl. No.: 11/938,552

(22) Filed: Nov. 12, 2007

(65) Prior Publication Data
US 2009/0083226 A1 Mar. 26, 2009

(51) Int. Cl.
G06F 7/00 (2006.01)
G06F 17/00 (2006.01)
G06F 17/30 (2006.01)

(52) U.S. Cl.
CPC .................. *G06F 17/30864* (2013.01)
USPC ............... 707/728; 707/759; 707/765

(58) Field of Classification Search
USPC ............... 715/781; 707/1, 708, 899, 500, 765; 709/224
See application file for complete search history.

(56) References Cited

U.S. PATENT DOCUMENTS

| 5,745,754 | A * | 4/1998 | Lagarde et al. ............... 1/1 |
| 6,341,281 | B1 * | 1/2002 | MacNicol et al. ............ 1/1 |
| 6,516,310 | B2 * | 2/2003 | Paulley ...................... 1/1 |
| 6,606,657 | B1 * | 8/2003 | Zilberstein et al. ........... 709/224 |
| 6,714,934 | B1 * | 3/2004 | Fordham ..................... 707/708 |
| 7,047,502 | B2 * | 5/2006 | Petropoulos et al. ......... 715/781 |
| 7,107,284 | B1 * | 9/2006 | Betz et al. ................... 1/1 |
| 7,120,645 | B2 * | 10/2006 | Manikutty et al. ............ 1/1 |
| 7,231,600 | B2 * | 6/2007 | Zhou et al. .................. 715/236 |
| 7,370,061 | B2 * | 5/2008 | Chakraborty et al. ........ 1/1 |
| 7,437,374 | B2 * | 10/2008 | Chen et al. ................... 1/1 |
| 7,647,293 | B2 * | 1/2010 | Brown et al. ............. 707/999.002 |
| 8,429,184 | B2 * | 4/2013 | Ismalon .................... 707/765 |
| 2002/0010709 | A1 * | 1/2002 | Culbert et al. ............... 707/500 |
| 2004/0111701 | A1 * | 6/2004 | Beust ........................ 717/108 |
| 2004/0143570 | A1 * | 7/2004 | Klock et al. ................. 707/3 |
| 2008/0077558 | A1 * | 3/2008 | Lawrence et al. ........... 707/3 |

OTHER PUBLICATIONS

India Intellectual Property Building, "First Examination Report" in application No. 2114/CHE/2007, dated Sep. 16, 2013, 3 pages.
Current Claims in application No. 2114/CHE/2007, dated Sep. 2013, 14 pages.

* cited by examiner

*Primary Examiner* — Susan Chen
(74) *Attorney, Agent, or Firm* — Hickman Palermo Truong Becker Bingham Wong LLP

(57) ABSTRACT

Techniques are provided through which query associations are made between initial queries and corresponding query modifications to the initial queries previously made. Each query modification is made with respect to a searchable source. Based on these query associations, modified queries are generated on a per-source basis. Query associations may be stored on a per user or per community basis, where a community can include many users. Frequently used query modifications may be stored as templates.

38 Claims, 9 Drawing Sheets

| QUERY ASSOCIATIONS | MODULE | RELEVANCE |
|---|---|---|
| Bangalore --> Bangalore cauvery water | news | 21 |
| Bangalore --> Bangalore dog deaths | news | 11 |
| Bangalore --> Bangalore industries | news | 8 |
| Bangalore --> Bangalore air shows | flickr | 15 |
| Bangalore --> Bangalore nandi hills | flickr | 7 |
| Bangalore --> Bangalore pubs | web | 7 |
| Bangalore --> Bangalore monuments | web | 5 |
| Bangalore --> Bangalore list of hotels | web | 2 |

| QUERY ASSOCIATIONS FOR THE TEMPLATE "TRAVEL" | MODULE |
|---|---|
| travel --> news | Yahoo Video |
| travel --> best places | Yahoo Answers |
| travel --> hotels | Yahoo Search |
| travel --> latest | Yahoo News |
| travel --> monuments | Yahoo Image Search |
| travel --> food | Flickr |

FIG. 7

TECHNIQUES FOR MODIFYING A QUERY BASED ON QUERY ASSOCIATIONS

CROSS REFERENCE TO RELATED APPLICATIONS

This application is related to and claims the benefit of priority from Indian Patent Application No. 2114/CHE/2007 filed by Kawale et al. in India on Sep. 20, 2007, entitled "Techniques for Modifying a Query Based on Query Associations"; the entire content of which is incorporated by this reference for all purposes as if fully disclosed herein.

FIELD OF THE INVENTION

The present invention relates to search engines and, more specifically, to a technique for modifying queries to search engines based on query associations.

BACKGROUND

Search engines that enable computer users to obtain references to web pages that contain one or more specified words are now commonplace. Typically, a user can access a search engine by directing a web browser to a search engine "portal" web page. The portal page usually contains a text entry field and a button control. The user can initiate a search for web pages that contain specified query terms by typing those query terms into the text entry field and then activating the button control. When the button control is activated, the query terms are sent to the search engine, which typically returns, to the user's web browser, a dynamically generated web page that contains a list of references to other web pages, also known as a list of search results, which contain or are related to the query terms.

Although search engines generally perform well in refining and ranking relevant search results, often a user is unsatisfied with the search results generated by an initial query to a search engine, prompting the user to modify the initial query and to submit the modified query to the search engine in order to obtain a set of search results which are better matched to the user's intended search criteria. This problem is especially acute with search engines that allow a user to simultaneously search across multiple content sources at once. Examples of content sources include news repositories, Google Book Search, Yahoo Image Search, and video repositories. Due to the difference in content from these content sources, a single query often does not produce optimal search results across all content sources. Neither can a generic modification give satisfactory results in all the content source. As a result, users often submit modified queries to the content sources which are specific to a particular content source. A user's modified query to a particular content source can be very helpful in producing more relevant search results. However, currently there are no means available through which a user can create associations on a per content source basis or leverage previous query modifications for a particular content source in order to enhance the relevance of future search results.

Furthermore, a user may benefit from the query modifications that others have made. As discussed above, when a user submits an initial query to content source in a search engine and receives results that do not satisfy the user's intended search criteria, the user may modify the initial query and submit the modified query to the content source. If the search results generated from the modified query remains unsatisfactory, however, the user may not be able to come up with more ideas for further query modifications to enhance the search results. On the other hand, other users who have submitted the same initial query may have developed query modifications which would be helpful to the unsatisfied user. Nonetheless, currently there is no available means through which a user can access and leverage the query modifications that other users have made.

Finally, a user who has made query modifications on a per-module basis may wish to store such query modifications and retrieve them later on for other queries. However, currently, there is no means through which a user can store and retrieve specific query modifications for future queries.

Therefore, there is a need for a way to automatically generate modified queries for multiple searchable content sources based on previous modified queries so that previous query modifications which enhance the relevance of search results can be leveraged for future search queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 is a table that illustrates an example of query associations created for a template.

DETAILED DESCRIPTION

Figure 1:
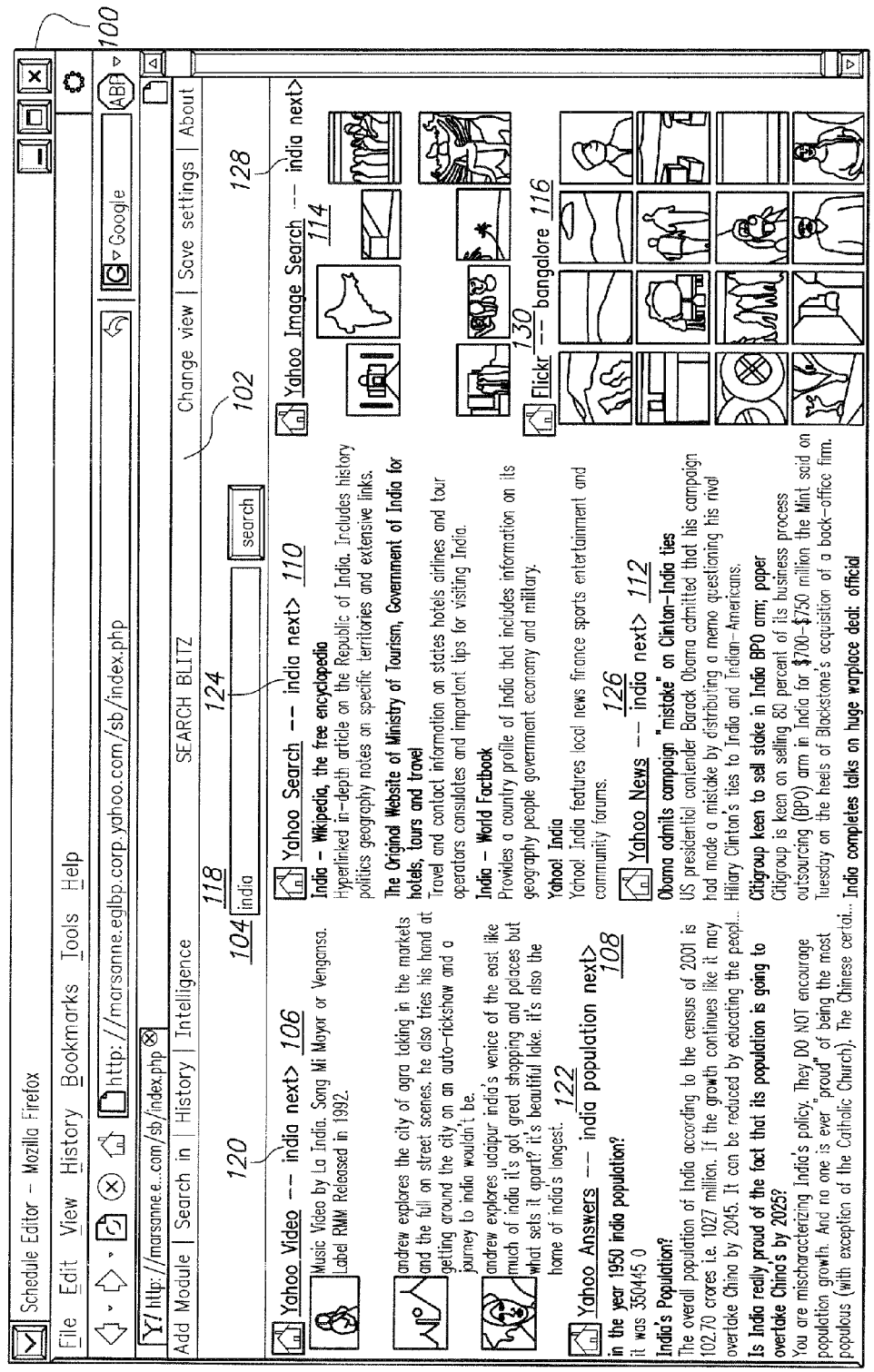
FIG. 1 is a diagram that illustrates an example of a web browser displaying a search engine web page containing multiple searchable content source modules.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided through which query associations are made between (a) previously-received queries and (b)

previously-made modifications to the previously-received queries. The previously-made modifications that are associated with a particular query are referred to herein as the "associated modifications" of the particular query. Based on these query associations, a search engine can automatically generate a modified query upon detecting that a user-submitted query has an associated modification. Alternatively, the user may be given an option to either proceed with a search based on an unmodified query, to proceed with a search based on an automatically generated modified query.

According to one technique, in a search engine that allows a user to search across multiple content sources, query associations are made on a per-content source-basis. That is, the same query may have one associated modification for one content source, and a completely different content modification for another content source. These per-content-source query associations may similarly be used to automatically generate modified queries upon detecting that a user-submitted query has an association with a content-source-specific query modification.

According to another technique, the query modifications made by a group, or community, of users are aggregated and query associations are made between initial queries and an aggregated set of modifications. Similar to the other types of query modifications described herein, community-created query associations may be used to automatically generate modified queries upon detecting that a user-submitted query has an association with a query modification. According to one technique, the community-created query modifications may be ranked according to relevance. Relevance, in this context, may be based, for example, on the frequency that a particular query modification was used and how long ago in time the particular query modification was used. According to another technique, a user may request that the search engine automatically generate modified queries based on query associations created by both the community and the user.

In yet another technique, a user may create and store a template of query modifications for multiple searchable content sources. A stored template of query modifications can then be specified and utilized for future queries.

These techniques, and variations and extensions of these techniques, are described in greater detail below.

Automatically Generating Query Modifications Based on Query Associations for Multiple Searchable Content Sources In one embodiment, users can simultaneously search across multiple content sources. For example, on a search engine's web page, a user types in one query in a text entry field and submits the query, where the query is submitted to several content sources such as an image repository, a repository of top news stories, and an information database. The search results from each content source is then aggregated and listed on one web page, advantageously providing the user with an overview of the search results from different types of content sources. In one implementation, each content source is represented by a "module" on the main search engine web page, where the module lists the name of the content source, the search results within that content source, and hyperlinks for accessing the content source and the search results. In one implementation, the user may add or delete content source modules to and from a search engine's main web page to customize the set of content sources on which searches are performed. In another embodiment, the user may customize the number of results she wants from each content source.

In submitting a query to a search engine that contains multiple content sources, a user submits an initial query, and the search engine generates a list of search results for each content source, based on the initial query. Sometimes, the user is satisfied with the lists of search results and the query process terminates. However, frequently the user is not satisfied with the list of search results generated from the initial query because the search results did not satisfy the user's intended search criteria for a particular content source or content sources. In an example, a user is interested in finding out more about San Francisco. This user submits an initial query to the search engine, where the initial query is "San Francisco". In this example, the search engine contains content sources for images, maps, and news. Accordingly, the search engine generates three lists of search results based on the initial query "San Francisco", where the lists of search results are generated for each of the three content sources. The user is satisfied with the search results for the map content source, but wishes to modify the queries to the images and news content sources. Subsequently, the user submits the modified query "San Francisco city hall" to the images content source and "San Francisco elections" to the news content source. These modified queries better track the user's search intentions for the images and news content sources, and the lists of search results generated from the images and news content sources based on the modified queries are more relevant and satisfactory to the user.

In one embodiment, the search engine automatically generates and stores a query association between an initial query and any query modification subsequently made to the initial query on a per content source basis. In the example just discussed, the search engine generates a query association between "San Francisco" and "San Francisco city hall" for the images content source and a query association between "San Francisco" and "San Francisco elections" for the news content source. These query associations are stored in a query association database accessible to the search engine so that the search engine may, at a later time, look up whether there are any query modifications associated with a particular query for a particular query source.

In one embodiment, a search engines uses query associations to automatically generate modified queries for searching content sources. Continuing with the example above, the second time the user enters the query "San Francisco" in the search engine, the search engine accesses the query association database to determine whether there are any query associations for "San Francisco". In this example, the search engine determines that query associations exist for "San Francisco" for the images content source and the news content source. Consequently, the search engine submits the modified queries contained in the query associations for their respective content sources instead of submitting the initial queries. In this case, the query "San Francisco city hall" is submitted to the images content source and the query "San Francisco elections" is submitted to the news content source. By examining a user's past query modifications for individual content sources, the search engine automatically generates modified queries that often retrieve more relevant search results for the user.

In another embodiment, after generating the modified query, the search engine does not automatically execute the modified query in place of the initial query. Instead, the search engine presents the user with the option of either proceeding with the query as submitted or proceeding with a modified query that is associated with the submitted query. In this embodiment, the user is free to choose among these two options and is not locked into previously submitted query modifications. For example, the second time that the user enters "San Francisco", she may be interested in images of San Francisco in general. Thus, when the search engine presents to the user an option to continue with the modified query "San Francisco city hall" for the images content source, the user may then choose to forego this option and proceed with the query as entered, since she is now interested in images of San Francisco in general. Alternatively, the user may also enter a new modified query, such as "San Francisco Golden Gate Bridge", for the images content source.

In one embodiment, the query association database is specific to a particular user. Advantageously, personalized query association databases stores modified queries which are customized to a particular user's search intentions. To associate a user with a particular query association database, the user may be identified through a login process, via IP addresses, or any other means of identification.

Automatically Generating Query Modifications: Another Example

FIG. 1 illustrates an example of a search engine web page that contains multiple content sources. In FIG. 1, browser 100 displays search engine web page 102. Web page 102 contains a text entry field 104, which allows a user to type in a search query. Web page 102 also contains the following six content source modules: content source module 106 for the "Yahoo Video" content source, content source module 108 for the "Yahoo Answers" content source, content source module 110 for the "Yahoo Search" content source, content source 112 for the "Yahoo News" content source, content source 114 for the "Yahoo Image Search" content source, and content source 116 for the "Flickr" content source.

As discussed above, query associations are stored and retrieved on a per content source basis, thereby enabling a search engine to automatically generate modified queries on a per-source basis. Embodiments and variations discussed above with respect to query modifications in a single-source context are equally applicable to multiple content sources. For example, once the search engine has automatically generated a modified query for a particular content source, the search engine may use the modified query to query the particular content source or suggest the modified query for the particular content source to the user and allow the user to decide whether to proceed with using the modified query.

Figure 2:
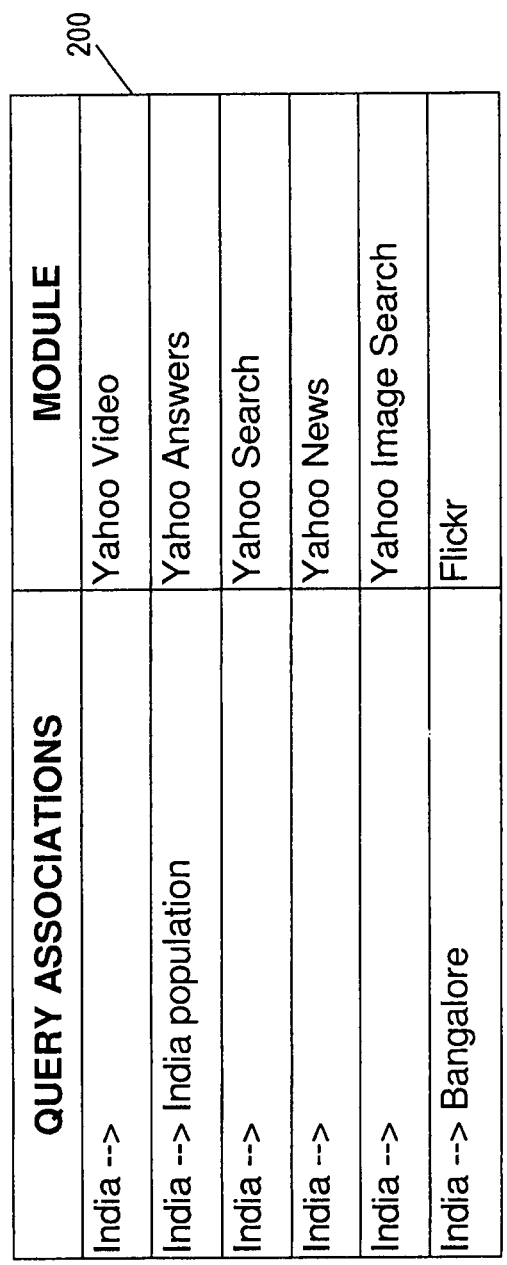
FIG. 2 is a table that illustrates an example of query associations on a per content source module basis.

FIG. 2 contains a table 200 that illustrates an example of storing query associations on a per content source basis. Table 200 is an example of storing query associations for the user-submitted query "India" for six content source modules. For four of the six content source modules ("Yahoo Video", "Yahoo Search", "Yahoo News", and "Yahoo Image Search"), there are no modified queries associated with the query "India". For the content source module "Yahoo Answers", however, the query "India" is associated with the modified query "India population". Similarly, for the content source module "Flickr", the query "India" is associated with the modified query "Bangalore". In one embodiment, information such as the information contained in table 200 is stored in a query associations database.

FIG. 1 illustrates an example of a search engine web page that has performed modified queries based on query associations on a per content source basis. The user has submitted "India" as a query 118 in text entry field 104. The search engine then accesses a query associations database to check if there are any query associations for query 118. In this example, the query associations database contains the information illustrated in table 200 in FIG. 2. As table 200 illustrates, there are no query modifications associated with content source modules 106 ("Yahoo Video"), content source module 110 ("Yahoo Search"), content source module 126 ("Yahoo News"), and content source module 114 ("Yahoo Image Search"). As a result, queries 120, 124, 126, and 128, which are performed on content source modules 106, 110, 112, and 114, respectively, are submitted as "India", which is unmodified from the user-submitted query 118. In contrast, the query 118 of "India" is associated with the query modification "India population" in table 200 for content source module 108 ("Yahoo Answers"). As a result, query 122 is submitted to content source module 108 as "India population". Similarly, the query 118 of "India" is associated with the query modification "Bangalore" in table 200 for content source module 116 ("Flickr"). Consequently, query 130 is submitted to content source module 116 as "Bangalore".

Determining a Query Modification when there are Multiple Query Associations

A query may be associated with more than one query modification. For example, in a first search session, a user submits an initial query of "San Francisco" and then submits a query modification of "San Francisco city" to the images content source. In a second search session, the same user submits an initial query of "San Francisco" and then submits a query modification of "San Francisco Golden Gate Bridge" to the images content source. In one embodiment, multiple query associations may be stored for a query and a content source in the query association database. In this example, the query association database stores both "San Francisco shopping city hall" and "San Francisco Golden Gate Bridge" as query modification for the query "San Francisco" with respect to the images content source. A search engine which looks up "San Francisco" in the query association database with respect to the images content source consequently retrieves both of these query modifications.

When multiple query modifications are associated with a single query, a ranking scheme may be employed to rank the query modifications in terms of relevance. In one embodiment, the relevance of a query modification is based on the frequency that the user has indicated that the query modification is "useful". When a user enters in a query modification, this action indicates that the query modification is "useful". In one embodiment, a user may be given the option to proceed with an initial query or to proceed with a modified query generated from the initial query. If the user chooses to proceed with the modified query, this action also indicates that the query modification is "useful" because the user has chosen to use the modified query. Finally, in an embodiment where the search engine automatically generates search results based on a modified query, if the user selects one of the web pages listed in the search results or selects a link to view search results not currently displayed, this is also an indication that the query modification is "useful". Whenever there is an indication that a query modification is "useful", the frequency of usefulness for that query modification is incremented. In contrast, when a user ignores an automatically generated list of search results based on a query modification, this indicates that the user did not find the query modification useful, and the frequency of usefulness of that query modification is not incremented.

In another embodiment, relevance is based on the age of the query modifications. The age of a query modification corresponds to how recently a user has indicated that the query modification was "useful". The more recently a query modification was found to be "useful", the more relevant the query modification. Finally, in yet another embodiment, both frequency and age are employed to rank the relevance of multiple modified queries.

In one embodiment, the search engine selects the highest ranked modified query among multiple associated modified queries and automatically generates search results based on this modified query or presents this modified query to the user as a search query option, as discussed above. In another embodiment, the user may select other high-ranked associated modified queries from an interface such as a drop-down menu.

Generating Query Modifications Based on Query Associations Formed by a Community of Users In another technique, query associations between initial queries and modified queries are aggregated and stored for a group, or community, of users. Subsequent queries are checked against the community's query associations to generate modified queries. Advantageously, this technique allows a user to leverage the query modifications that other users have made with respect to the same initial query, which can assist the user in procuring better and more relevant search results. This technique may be applied on a single content source or across multiple content sources.

In this technique, it is highly likely that a single initial query is associated with multiple query modifications because in a pool of a large number of users, different users are likely to have modified queries in different ways. When a single initial query is associated with multiple query modifications, the techniques discussed above for ranking query modifications based on relevance are equally applicable here. That is, query modifications which are more relevant are ranked higher and will be utilized more than modified queries which are less relevant. As discussed above, one technique for determining relevance is based on the frequency of use and the age of the query modification.

Figure 3:
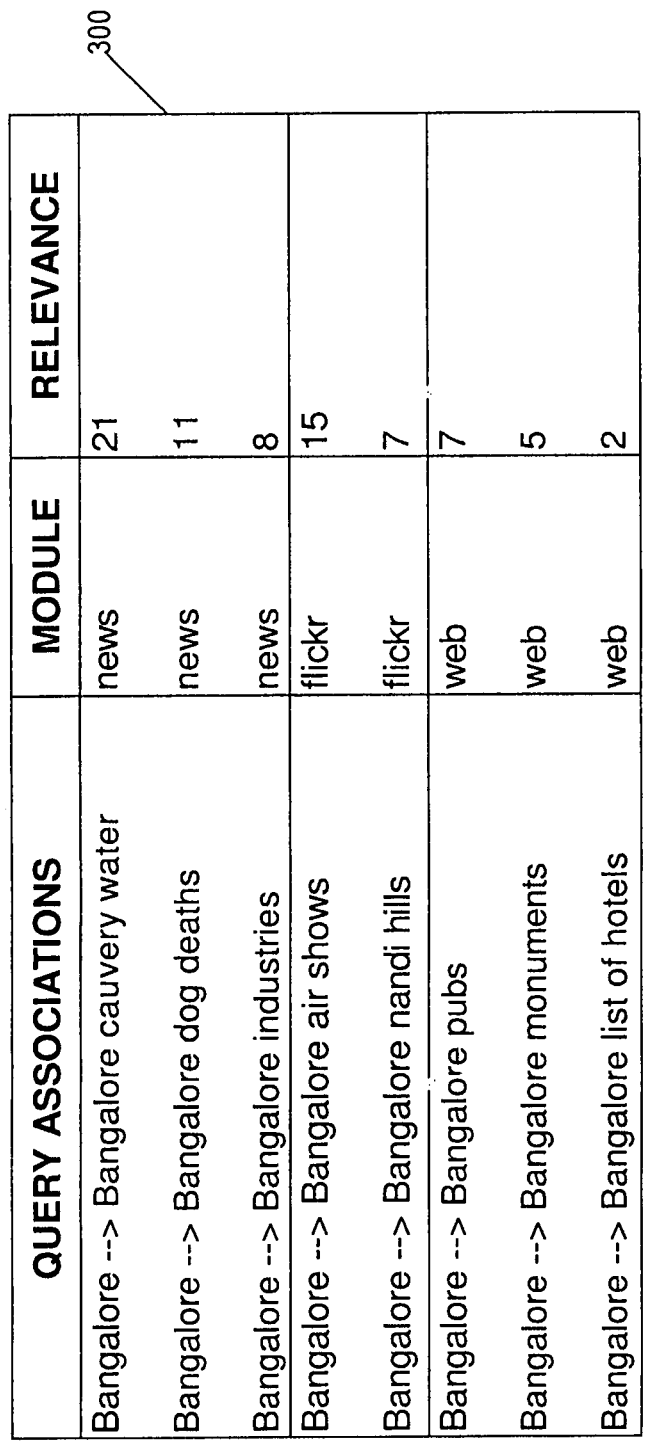
FIG. 3 is a diagram that illustrates an example of query associations on a per content module basis with relevance rankings.

FIG. 3 illustrates an example where multiple modified queries are associated with the same initial query, and where the query associations are stored on a per content source basis. Table 300 shows that for the "news" content source module, there are three different associated modified queries for the query "Bangalore". These three associated modified queries are ranked by relevance. Similarly, there are two different associated modified queries for "Bangalore" in the "flickr" content source module, and three different associated modified queries for "Bangalore" in the "web" content source module. In one technique, only the top-ranked associated modified query in each content source module is used to automatically generate a modified query for searching or suggesting to the user. In another technique, the user may select other high-ranked associated modified queries from an interface such as a drop-down menu.

In one technique, the community of users consists of all users of a search engine. In another technique, the community of users for a particular user consists of all users who have been designated as "friends" of the particular user. As discussed above, a user may be required to identify himself by inputting a login and a password, allowing the search engine to store query modifications on a per-user basis. In addition, a particular user may also designate the logins of other users as a "friend" so that a search engine will access the stored query modifications of the particular user's friends in checking for modified queries. Although techniques have been described for a global community and a community of friends, other techniques for defining a community, such as by a user's IP address and by a user's membership in a particular group, are also possible variations and are within the scope of this invention.

Applying Query Modifications in a Customized Order

Figure 4:
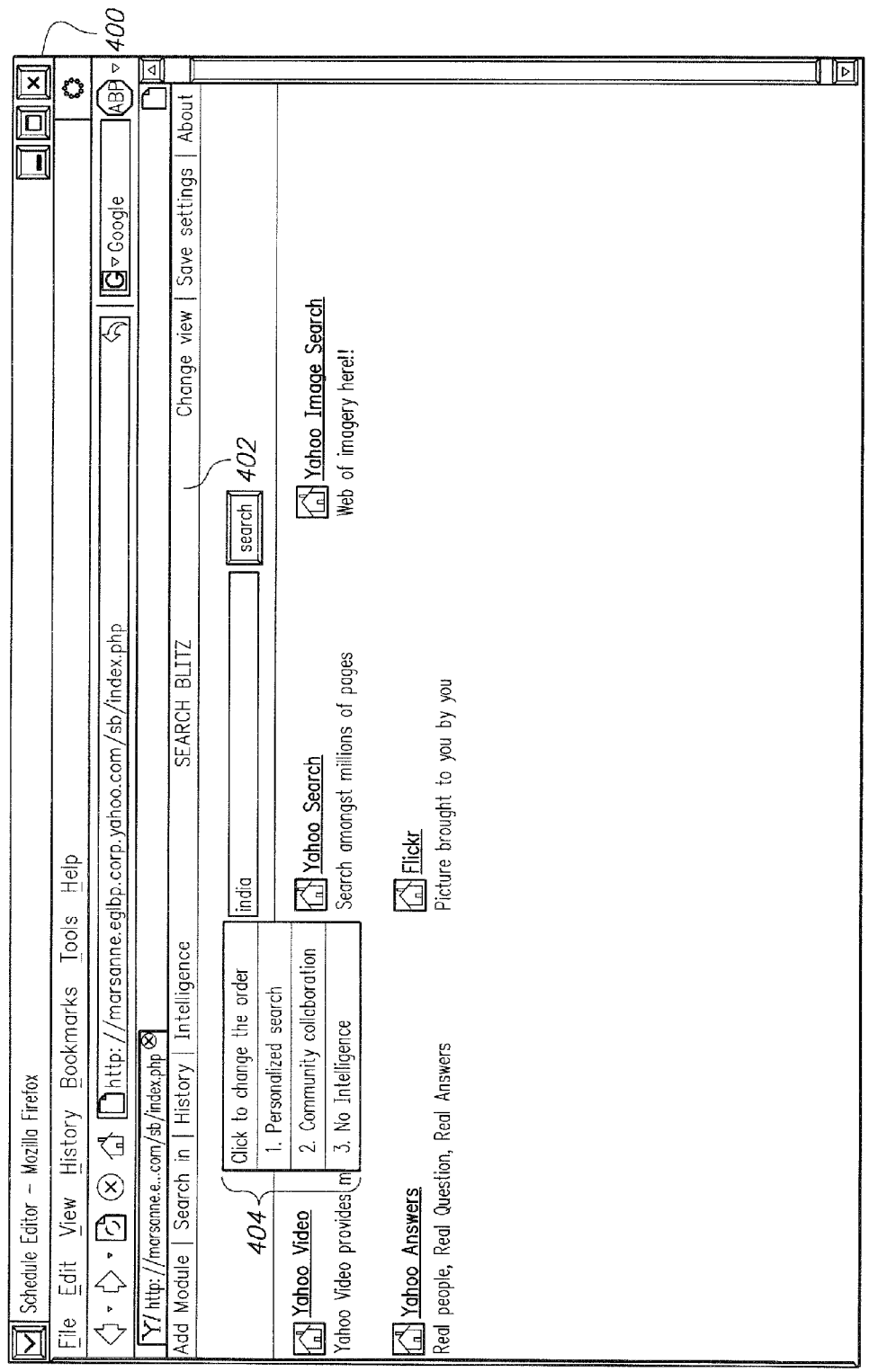
FIG. 4 is a diagram that illustrates an example of a web browser displaying a search engine web page that contains an interface for ordering preferences in applying query associations.

In one technique, a user can choose to apply query modifications based on personal modified queries, community modified queries, or forego applying query modifications. In another technique, a user can choose a preferred order for applying query modifications based on personal modified queries and community modified queries. FIG. 4 illustrates an example where web browser 400 is displaying search engine web page 402. Search engine web page 402 contains an interface 404 through which a user may change the preferred order for applying modified queries. As illustrated, interface 404 shows that the current preferred order is: apply personalized modified queries first, then apply community modified queries, and then perform the search without any query modifications.

Figure 5:
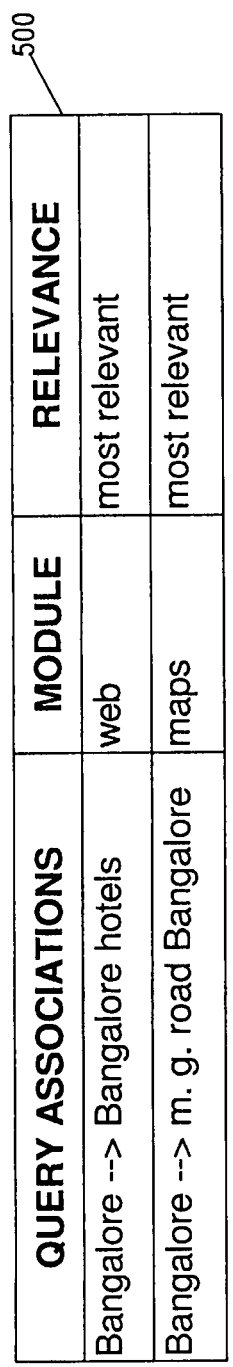
FIG. 5 is a table that illustrates another example of query associations on a per content source module basis.

An example will illustrate in detail how the preferred order in interface 404 is applied. In this example, a query association database has stored information for a particular user as illustrated in table 500 in FIG. 5. This information shows that for the "web" content source module, the most relevant query modification for "Bangalore" is "Bangalore hotels", based on the particular user's past query modifications. Also based on the particular user's past query modifications, the most relevant query modification for "Bangalore" for the "maps" module is "m. g. road Bangalore". Furthermore, in this example, the query association database has stored information for a community of users as illustrated in table 300 in FIG. 3.

Figure 6:
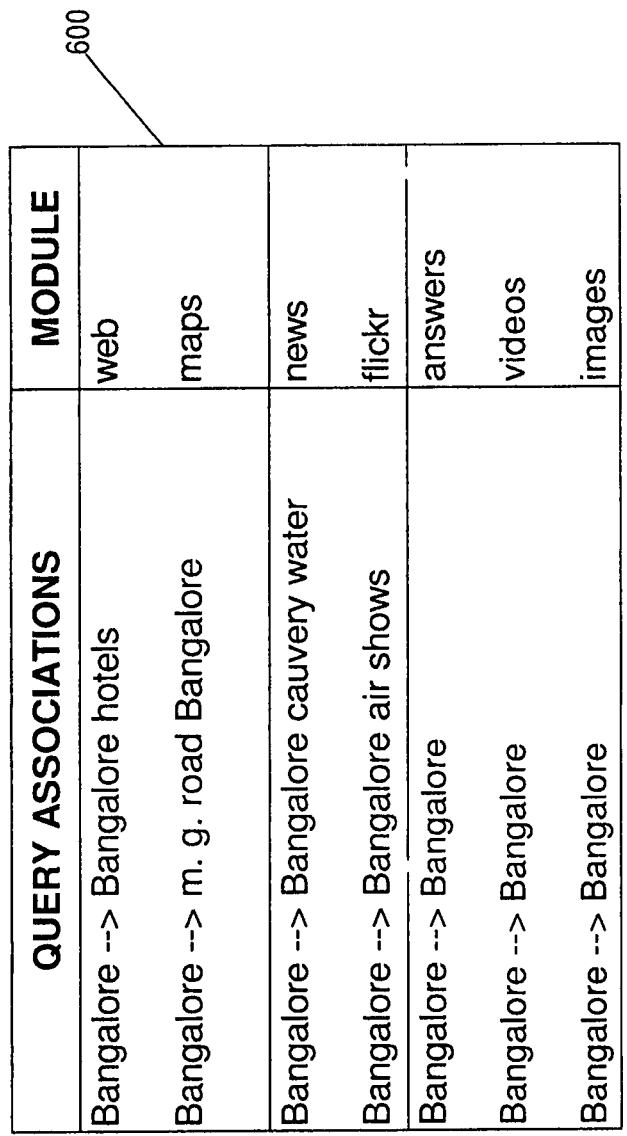
FIG. 6 is a table that illustrates an example of query associations on a per content source module basis after application of query association preferences.

The particular user sets his preferred order for applying query modifications as illustrated in interface 404, and submits a query for "Bangalore" in the search engine. Table 600 in FIG. 6 illustrates the modified queries generated for the particular user for the query "Bangalore". First, based upon the preferred order in interface 404, where personalized modified queries are applied first, the search engine first checks to see if there are any query associations for the particular user related to the query "Bangalore". The search engine accesses information in a query association database, which has stored the information illustrated in table 500. Since there are query modifications for the content source modules "web" and "maps", these query modifications are selected by the search engine to generate modified queries for these modules, as illustrated in table 600. Next, based upon the preferred order in interface 404, the search engine next checks the query association database to see if there are any query associations for the community related to the query "Bangalore". Table 300 shows that there are associated modified queries for "Bangalore" for the "news", "flickr", and "web" modules. However, the query modifications for the "web" module for the community are ignored because a query modification for the "web" module has already been applied from the particular user's stored personal query associations. For the "news" and "flickr" modules, however, where the particular user's personal query associations do not contain any associated modified queries, the highest-ranked associated modifications based on the community's query associations are selected. Table 600 illustrates that the query modification "Bangalore cavery water" is selected for the "news" module, and that the query modification "Bangalore air shows" is selected for the "flickr" module. Finally, for content source modules for which there are no query associations, either personalized or community-based, the query is submitted without any modification. Table 600 illustrates that in this example, the content source modules "answers", "video" and "images" do not have any query modifications associated with "Bangalore", either personal or community-based. As a result, the query "Bangalore" is not modified and is submitted as-is for these three modules.

Templates for Query Modifications

Users often perform similar query modifications for different queries. For example, a particular user who is deciding where to vacation may wish to search for hotels both in Cancun and Acapulco. Performing similar query modifications can become tedious and users may forget the particular query modifications that are useful in generating relevant results. Performing similar query modifications are especially burdensome when the user is querying across multiple content sources and wishes to enter a different modified query for each content source. Therefore, in one technique, a tool for creating query modification templates is provided to the user and the user-created query modification template is stored and accessed at a later time to facilitate the submission of similar queries.

Table 700 in FIG. 7 illustrates an example of a user-created query modification template. The name of the template is "travel", and the user has inputted a different query modification for six different content source modules. Specifically, the template "travel" associates query modification "news" with content source module "Yahoo Video", query modification "best places" with content source module "Yahoo Answers", query modification "hotels" with content source module "Yahoo Search", query modification "latest" with content source module "Yahoo News", query modification "monuments" with content source module "Yahoo Image Search", and query modification "food" with modified content source "Flickr".

Figure 8:
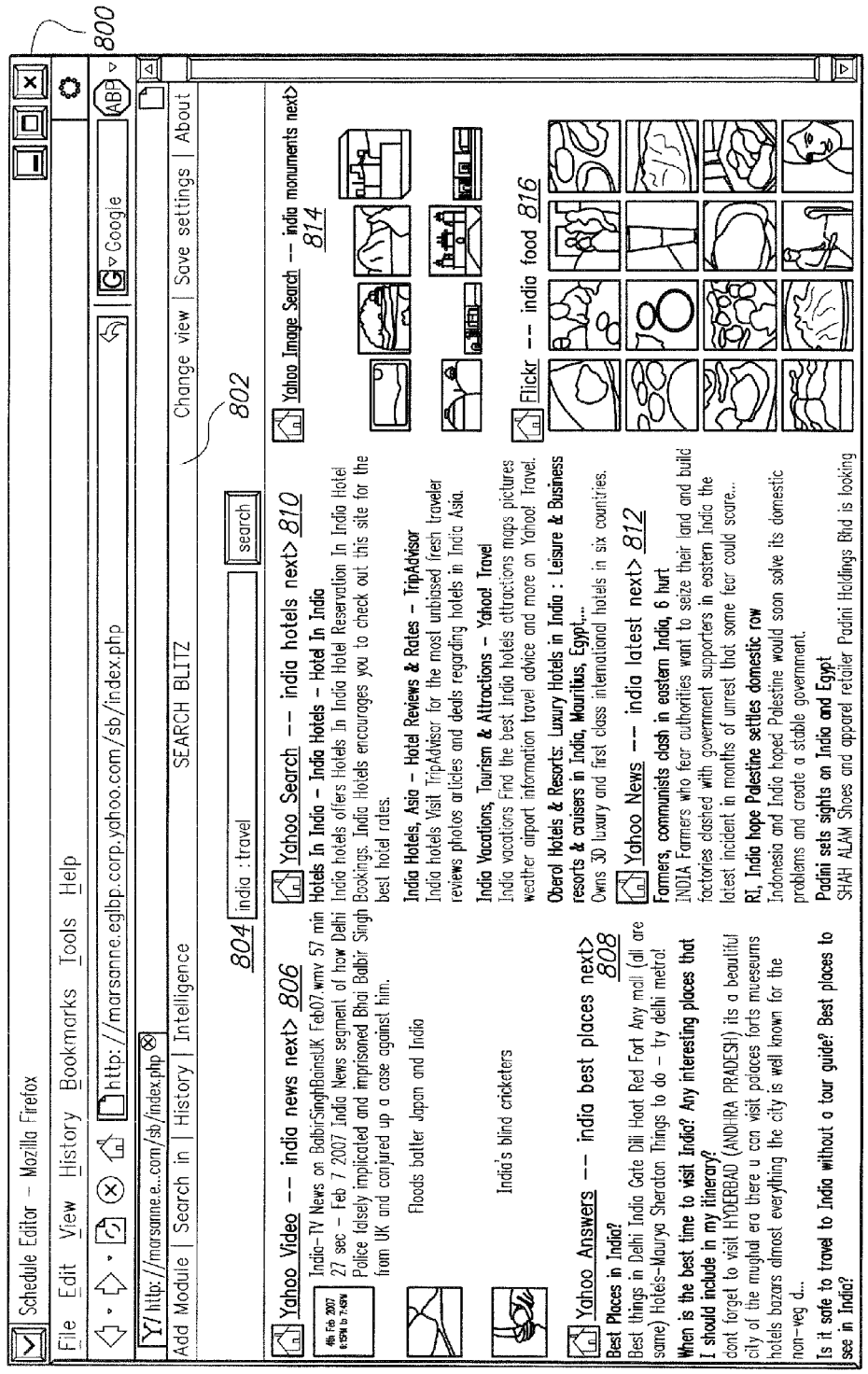
FIG. 8 is a diagram that illustrates an example of a web browser displaying a search engine web page showing the results after a query association template has been applied.

FIG. 8 illustrates an example where a user uses the template outlined in table 700 in a search engine that supports query modification templates. Web browser 800 is displaying search engine web page 802, which contains text entry field 804. A user has entered "India:travel" in the text entry filed 804 to indicate that the "travel" template should be used with the query "India". Other means of indicating a template are also possible. In one embodiment, the query modifications stored in table 700 as part of the "travel" template are appended to the initial query, in this case "India", to generate modified queries for querying the different content source modules. As illustrated in FIG. 8, the modified query "India news" is applied to content source module 806 ("Yahoo Video"), the modified query "India best places" is applied to content source module 808 ("Yahoo Video"), the modified query "India hotels" is applied to content source module 810 ("Yahoo Search"), the modified query "India latest" is applied to content source module 812 ("Yahoo News"), the modified query "India monuments" is applied to content source module 814 ("Yahoo Image Search"), and the modified query "India food" is applied to content source module 816 ("Flickr"). In other embodiments, the query modifications may be combined with the initial query in different ways, such as by first performing a search on the initial query and then performing a search for the modified query on the search results from the initial query.

In one technique, a user may use multiple templates in the same query. In another technique, a user may employ templates which were created by other users in a community in order to leverage the querying experience of other users.

Hardware Overview

Figure 9:
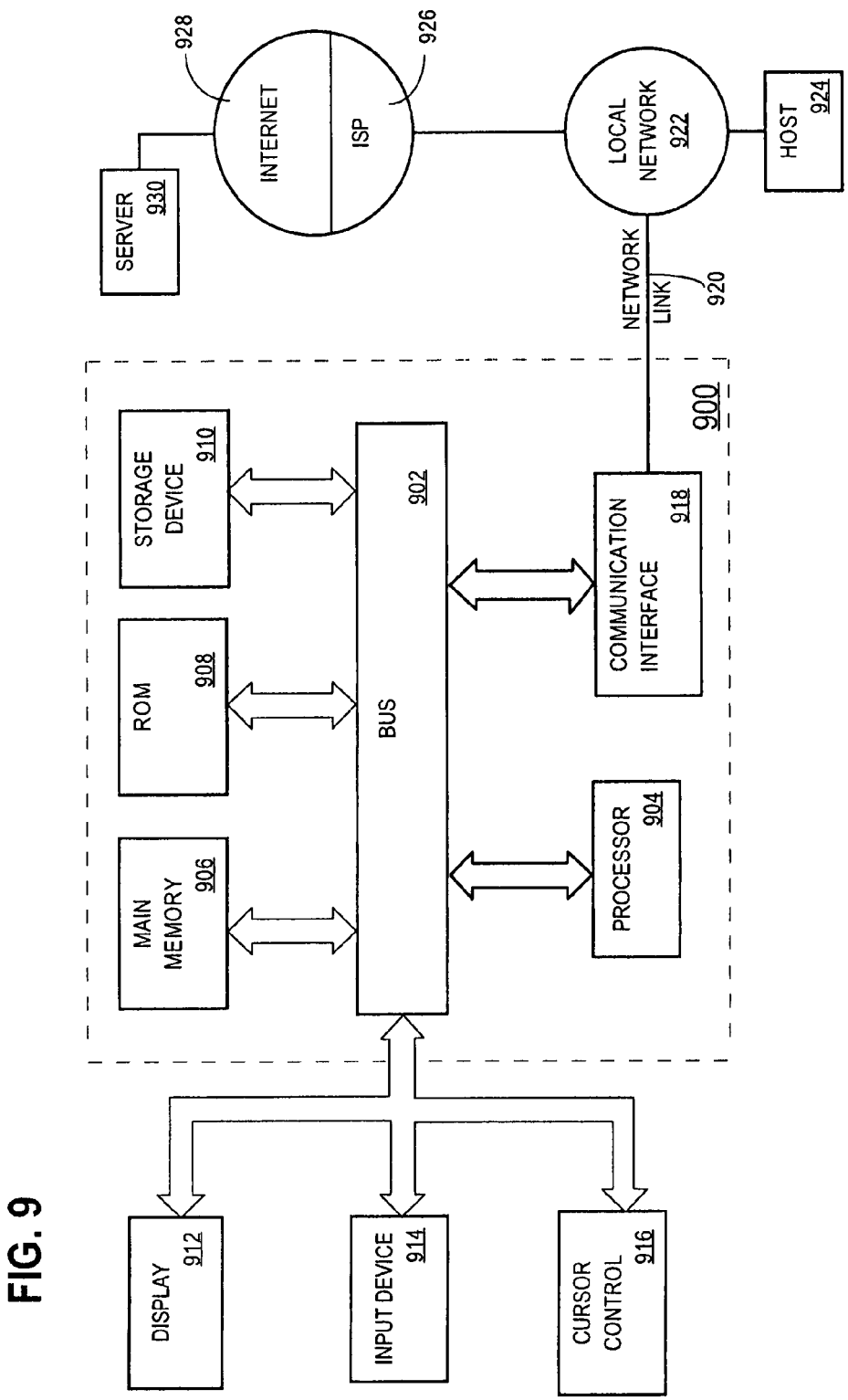
FIG. 9 is a block diagram of a computer system on which embodiments of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to storage media and transmission media. Storage media includes both non-volatile media and volatile media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for handling queries, comprising:
　　storing associations that indicate how to modify user-submitted queries that are to be sent to a plurality of searchable sources;
　　wherein the associations include a first association between
　　　　a first modification,
　　　　one or more keywords, and
　　　　a first searchable source;
　　wherein the associations include a second association between
　　　　a second modification,
　　　　the one or more keywords, and
　　　　a second searchable source;
　　after storing the associations that indicate how to modify user-submitted queries, receiving a user-submitted query, comprising the one or more keywords, to be sent to the plurality of searchable sources;
　　in response to receiving the user-submitted query, performing the steps of:
　　　　generating a first modified query to be sent to the first searchable source of the plurality of searchable sources;
　　　　wherein the first modified query is generated by adding a first additional text to the user-submitted query based on
　　　　　　existence of the one or more keywords in the user-submitted query and
　　　　　　the first association;
　　　　generating a second modified query to be sent to the second searchable source of the plurality of searchable sources;
　　　　wherein the second modified query is generated by adding a second additional text to the user-submitted query based on
　　　　　　existence of the one or more keywords in the user-submitted query and
　　　　　　the second association;
　　　　wherein the first association is different than the second association;
　　　　wherein the first modification is different than the second modification;
　　　　wherein the first searchable source is separate from the second searchable source; and
　　　　wherein the method is performed by one or more computing devices.

2. The method of claim 1, further comprising:
　　receiving an initial query;
　　wherein the initial query is received before receiving said user-submitted query;

after receiving the initial query, receiving a modification to the initial query, storing an association between the initial query and the modification in a query association database;

determining whether the query association database contains an association for the user-submitted query based on the association between the initial query and the modification; and in response to determining that the query association database contains an association for the user-submitted query, performing the steps of:

extracting, from the query association database, the association for the user-submitted query; and based on the user-submitted query and the association for the user-submitted query, generating and storing in volatile memory the first modified query.

3. The method of claim 2, wherein:

the initial query, the modification to the initial query, and the user-submitted query, are all received from a particular user; and storing the association is performed on a user-specific basis, thereby causing the association between the initial query and the modification to the initial query to be maintained relative to said particular user; and determining whether the query association database contains an association for the user-submitted query involves determining whether the query association database contains an association for the user-submitted query for the particular user.

4. The method of claim 2, wherein:

the initial query and the modification to the initial query are received from a first user;

the user-submitted query is received from a second user that is different than the first user.

5. The method of claim 2, further comprising:

displaying the first modified query to a user;

receiving, from the user, input indicating whether the user has selected the first modified query; and in response to determining that the user has selected the first modified query, submitting the first modified query to a search engine.

6. The method of claim 2, wherein associations in the query association database contain data indicating a number of usefulness indications that has been received for an association in the query association database;

wherein the step of storing the association further comprises incrementing data indicating the number of usefulness indications that has been received for the association;

further comprising:

receiving input indicating whether the first modified query is useful;

in response to the input indicating that the first modified query is useful, incrementing the data indicating the number of usefulness indications that has been received for the association for the user-submitted query.

7. The method of claim 6, wherein the relevance of an association for a query in the query association database depends on how frequently usefulness indications for the association have occurred.

8. The method of claim 6, wherein the relevance of an association for a query in the query association database depends on how long ago a usefulness indication for the association has occurred.

9. The method of claim 2 further comprising performing the following steps in response to determining that the query association database contains an association for the user-submitted query:

determining that the query association database contains more than one association for the user-submitted query;

in response to determining that the query association database contains more than one association for the user-submitted query determining which association, associated with the user-submitted query, has a highest relevance; and extracting, from the query association database, the association, associated with the user-submitted query, that has the highest relevance;

based on the user-submitted query and the extracted association, generating and storing in volatile memory a modified query.

10. The method of claim 3, wherein the particular user is associated with a first identification, and wherein the step of storing an association comprises storing an association that establishes a relationship between the initial query, the user-submitted query, and the first identification.

11. The method of claim 10, wherein the first identification indicates whether the particular user is a member of a community of users.

12. The method of claim 10, wherein:

the step of determining the query association database contains an association comprises determining whether the query association database contains an association among the initial query, the user-submitted query, and the first identification; and the steps of extracting and generating are performed in response to determining that the query association database contains an association that establishes a relationship between the initial query, the user-submitted query, and the first identification.

13. The method of claim 2, wherein the initial query is associated with the first searchable source of the plurality of searchable sources;

the step of storing an association comprises storing an association that establishes a relationship between the initial query, the user-submitted query, and the first searchable source;

the step of determining comprises determining whether the query association database contains an association that establishes a relationship between the initial query, the user-submitted query, and the first searchable source; and the steps of extracting and generating are performed in response to determining that the query association database contains an association that establishes a relationship between the initial query, the user-submitted query, and the first searchable source.

14. The method of claim 1, further comprising:

determining that said user-submitted query matches an initial query that was received before receiving said user-submitted query;

determining the first association based on the initial query that matches said user-submitted query.

15. The method of claim 1, wherein:

determining the first association is based on user-activity with respect to the first searchable source;

determining the second association is based on user-activity with respect to the second searchable source;

wherein the first modified query comprises one or more keywords derived from user-activity with respect to the first searchable source;

wherein the second modified query comprises one or more keywords derived from user-activity with respect to the second searchable source.

16. The method of claim 1, further comprising:
deleting one or more searchable sources from the plurality of searchable sources in response to a user's selection of the one or more searchable sources from the plurality of searchable sources;
wherein said deleting of said one or more searchable sources causes said one or more searchable sources to be excluded from a search conducted in response to receipt of said user-submitted query.

17. The method of claim 1, wherein each searchable source of the plurality of searchable sources is associated with a different respective type of content, the method further comprising:
generating a search results page that separately identifies (a) a first respective type of content associated with the first searchable source and search results produced only as a result of executing the first modified query relative to the first searchable source and (b) a second respective type of content associated with the second searchable source and search results produced only as a result of executing the second modified query relative to the second searchable source.

18. The method of claim 1, wherein adding a first additional text to the user-submitted query based on an existence of the-one or more keywords in the user-submitted query and the first association comprises replacing the one or more keywords with the additional text.

19. A non-transitory computer-readable storage medium storing instructions for handling queries, wherein the instructions include instructions which, when executed by one or more processors, cause the one or more processors to perform the steps of:
storing associations that indicate how to modify user-submitted queries that are to be sent to a plurality of searchable sources;
wherein the associations include a first association between
a first modification,
one or more keywords, and
a first searchable source;
wherein the associations include a second association between
a second modification,
the one or more keywords, and
a second searchable source;
after storing the associations that indicate how to modify user-submitted quires, receiving a user-submitted query, comprising the one or more keywords, to be sent to the plurality of searchable sources;
in response to receiving the user-submitted query, performing the steps of:
generating a first modified query to be sent to the first searchable source of the plurality of searchable sources;
wherein the first modified query is generated by adding a first additional text to the user-submitted query based on
existence of the one or more keywords in the user-submitted query and
the first association;
generating a second modified query to be sent to the second searchable source of the plurality of searchable sources;
wherein the second modified query is generated by adding a second additional text to the user-submitted query based on
existence of the one or more keywords in the user-submitted query and
the second association;
wherein the first association is different than the second association; and
wherein the first modification is different than the second modification;
wherein the first searchable source is separate from the second searchable source.

20. The non-transitory computer-readable storage medium of claim 19, further comprising instructions for:
receiving an initial query;
wherein the initial query is received before receiving said user-submitted query;
after receiving the initial query, receiving a modification to the initial query;
storing an association between the initial query and the modification in a query association database;
determining whether the query association database contains an association for the user-submitted query based on the association between the initial query and the modification; and
in response to determining that the query association database contains an association for the user-submitted query, performing the steps of:
extracting, from the query association database, the association for the user-submitted query; and
based on the user-submitted query and the association for the user-submitted query, generating and storing in volatile memory the first modified query.

21. The non-transitory computer-readable storage medium of claim 20, wherein:
the initial query, the modification to the initial query, and the user-submitted query, are all received from a particular user; and
storing the association is performed on a user-specific basis, thereby causing the association between the initial query and the modification to the initial query to be maintained relative to said particular user; and
determining whether the query association database contains an association for the user-submitted query involves determining whether the query association database contains an association for the user-submitted query for the particular user.

22. The non-transitory computer-readable storage medium of claim 21, wherein the particular user is associated with a first identification, and wherein the step of storing an association comprises storing an association that establishes a relationship between the initial query, the user-submitted query, and the first identification.

23. The non-transitory computer-readable storage medium of claim 22, wherein the first identification indicates whether the particular user is a member of a community of users.

24. The non-transitory computer-readable storage medium of claim 22, wherein:
the step of determining the query association database contains an association comprises determining whether the query association database contains an association among the initial query, the user-submitted query, and the first identification; and
the steps of extracting and generating are performed in response to determining that the query association database contains an association that establishes a relationship between the initial query, the user-submitted query, and the first identification.

25. The non-transitory computer-readable storage medium of claim 20, wherein:
the initial query and the modification to the initial query are received from a first user; and
the user-submitted query is received from a second user that is different than the first user.

26. The non-transitory computer-readable storage medium of claim 20, further comprising instructions for:
displaying the first modified query to a user;
receiving, from the user, input indicating whether the user has selected the first modified query; and
in response to determining that the user has selected the first modified query, submitting the first modified query to a search engine.

27. The non-transitory computer-readable storage medium of claim 20,
wherein associations in the query association database contain data indicating a number of usefulness indications that has been received for an association in the query association database;
wherein the step of storing the association further comprises incrementing data indicating the number of usefulness indications that has been received for the association;
further comprising instructions for:
receiving input indicating whether the first modified query is useful;
in response to the input indicating that the first modified query is useful, incrementing the data indicating the number of usefulness indications that has been received for the association for the user-submitted query.

28. The non-transitory computer-readable storage medium of claim 27, wherein the relevance of an association for a query in the query association database depends on how frequently usefulness indications for the association have occurred.

29. The non-transitory computer-readable storage medium of claim 27, wherein the relevance of an association for a query in the query association database depends on how long ago a usefulness indication for the association has occurred.

30. The non-transitory computer-readable storage medium of claim 20 further comprising instructions for performing the following steps in response to determining that the query association database contains an association for the user-submitted query:
determining that the query association database contains more than one association for the user-submitted query;
in response to determining that the query association database contains more than one association for the user-submitted query
determining which association, associated with the user-submitted query, has a highest relevance; and
extracting, from the query association database, the association, associated with the user-submitted query, that has the highest relevance;
based on the user-submitted query and the extracted association, generating and storing in volatile memory a modified query.

31. The non-transitory computer-readable storage medium of claim 20, wherein
the initial query is associated with the first searchable source;
the step of storing an association comprises storing an association that establishes a relationship between the initial query, the user-submitted query, and the first searchable source of the plurality of searchable sources;
the step of determining comprises determining whether the query association database contains an association that establishes a relationship between the initial query, the user-submitted query, and the first searchable source; and
the steps of extracting and generating are performed in response to determining that the query association database contains an association that establishes a relationship between the initial query, the user-submitted query, and the first searchable source.

32. The non-transitory computer-readable storage medium of claim 19, further comprising instructions for:
determining that said user-submitted query matches an initial query that was received before receiving said user-submitted query;
determining the first association based on the initial query that matches said user-submitted query.

33. The non-transitory computer-readable storage medium of claim 19, wherein:
determining the first association is based on user-activity with respect to the first searchable source;
determining the second association is based on user-activity with respect to the second searchable source;
wherein the first modified query comprises one or more keywords derived from user-activity with respect to the first searchable source;
wherein the second modified query comprises one or more keywords derived from user-activity with respect to the second searchable source.

34. The non-transitory computer-readable storage medium of claim 19, further comprising instructions for:
deleting one or more searchable sources from the plurality of searchable sources in response to a user's selection of the one or more searchable sources from the plurality of searchable sources;
wherein said deleting of said one or more searchable sources causes said one or more searchable sources to be excluded from a search conducted in response to receipt of said user-submitted query.

35. The non-transitory computer-readable storage medium of claim 19, wherein each searchable source of the plurality of searchable sources is associated with a different respective type of content, further comprising instructions for:
generating a search results page that separately identifies (a) a first respective type of content associated with the first searchable source and search results produced only as a result of executing the first modified query relative to the first searchable source and (b) a second respective type of content associated with the second searchable source and search results produced only as a result of executing the second modified query relative to the second searchable source.

36. The non-transitory computer-readable storage medium of claim 19, wherein instructions for adding a first additional text to the user-submitted query based on an existence of the-one or more keywords in the user-submitted query and the first association comprise instructions for replacing the one or more keywords with the first additional text.

37. A computer-implemented method for handling queries, comprising:
receiving a user-submitted query comprising one or more keywords directed against a plurality of searchable sources;

in response to receiving the user-submitted query, performing the steps of: (a) generating and storing in volatile memory a first modified query to be directed against a first searchable source of the plurality of searchable sources, wherein the first modified query is generated based on a first association between a first modification, said user-submitted query, and said first searchable source, and (b) generating and storing in volatile memory a second modified query to be directed against a second searchable source of the plurality of searchable sources, wherein the second modified query is generated based on a second association between a second modification, said user-submitted query, and said second searchable source;

wherein the first association is different than the second association;

wherein the first modification is different than the second modification;

wherein the method is performed by one or more computing devices;

storing, in a query template database, first data that establishes an association between (a) a plurality of template associations, and (b) a name of a particular template;

wherein each template association comprises an association between a modification and one or more searchable sources;

wherein said plurality of template associations include said first association and said second association;

prior to generating any modified queries for said user-submitted query, performing the steps of receiving the name of the particular template in association with said user-submitted query;

in response to receiving the name of the particular template in association with said user-submitted query, inspecting the first data to determine that the plurality of template associations are associated with said name and therefore should be used to generate modified queries based on the user-submitted query;

in response to determining that the plurality of template associations are associated with said name, extracting, from the query template database, the plurality of template associations;

for each of the plurality of template associations, generating a modified query, based on the modification specified in the template association, to be directed against the one or more searchable sources specified in the template association;

wherein generating and storing the first modified query and the second modified query are performed as part of generating a modified query for each of the plurality of template associations.

38. A non-transitory computer-readable storage medium storing instructions for handling queries, wherein the instructions include instructions which, when executed by one or more processors, cause the one or more processors to perform the steps of:

receiving a user-submitted query comprising one or more keywords directed against a plurality of searchable sources;

in response to receiving the user-submitted query, performing the steps of: (a) generating and storing in volatile memory a first modified query to be directed against a first searchable source of the plurality of searchable sources, wherein the first modified query is generated based on a first association between a first modification, said user-submitted query, and said first searchable source, and (b) generating and storing in volatile memory a second modified query to be directed against a second searchable source of the plurality of searchable sources, wherein the second modified query is generated based on a second association between a second modification, said user-submitted query, and said second searchable source;

wherein the first association is different than the second association;

wherein the first modification is different than the second modification;

storing, in a query template database, first data that establishes an association between (a) a plurality of template associations, and (b) a name of a particular template;

wherein each template association comprises an association between a modification and one or more searchable sources;

wherein said plurality of template associations include said first association and said second association;

prior to generating any modified queries for said user-submitted query, performing the steps of receiving the name of the particular template in association with said user-submitted query;

in response to receiving the name of the particular template in association with said user-submitted query, inspecting the first data to determine that the plurality of template associations are associated with said name and therefore should be used to generate modified queries based on the user-submitted query;

in response to determining that the plurality of template associations are associated with said name, extracting, from the query template database, the plurality of template associations;

for each of the plurality of template associations, generating a modified query, based on the modification specified in the template association, to be directed against the one or more searchable sources specified in the template association;

wherein generating and storing the first modified query and the second modified query are performed as part of generating a modified query for each of the plurality of template associations.

\* \* \* \* \*